Dec. 15, 1953 G. D. HUNT 2,662,407
THERMOMETER AND METHOD OF MANUFACTURE THEREOF
Filed April 6, 1946
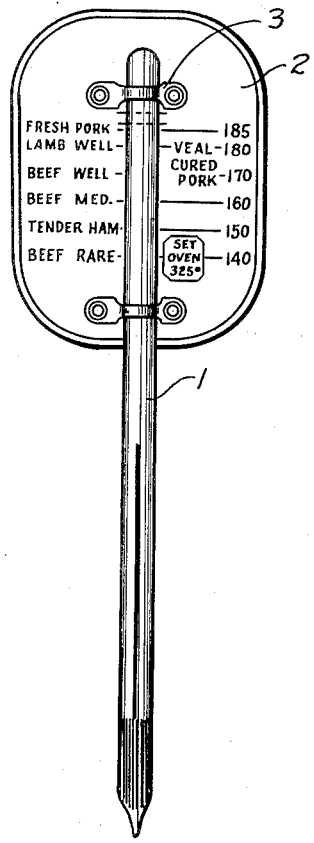
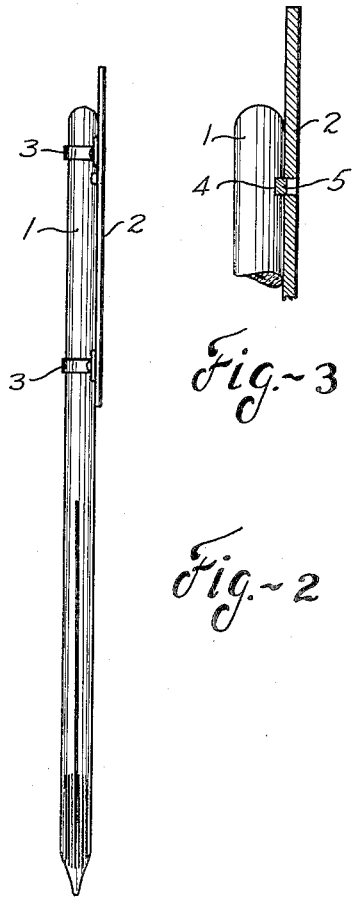
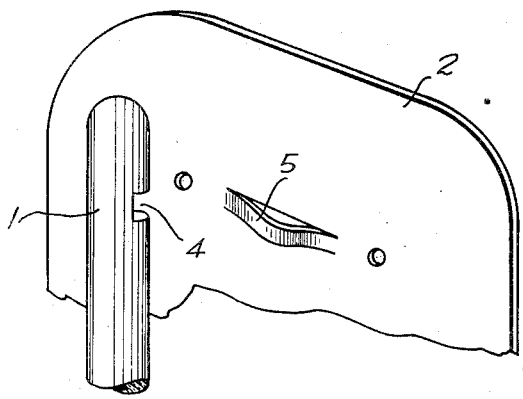
Inventor
George D. Hunt
F. C. Walker
By
Attorney Patented Dec. 15, 1953

2,662,407

UNITED STATES PATENT OFFICE 2,662,407

THERMOMETER AND METHOD OF MANUFACTURE THEREOF

George Dean Hunt, Springfield, Ohio, assignor to The Ohio Thermometer Company, Springfield, Ohio, a corporation of Ohio Application April 6, 1946, Serial No. 660,258

12 Claims. (Cl. 73—376)

This invention pertains to thermometers, and more particularly to means for accurately interlocking the indicating tube of the instrument with the graduated scale in predetermined relation to preserve the calibration thereof.

It is highly desirable that the indicating tube be held connected with the graduated scale of the instrument in accordance with its calibration against any possible displacement longitudinally of the tube or scale one relative to the other. It is not unusual to provide a lateral teat or beak upon the end of the indicating tube, as a part of the tube closing operation while the tube is still soft or plastic from having been heated to its fusing point. Such beak or teat is then engaged in a properly positioned hole in the graduated scale, to anchor the tube in its proper selected relation to the graduations.

However it is found quite difficult to properly locate the laterally turned beak or teat while the tube is still hot and soft. As result the tube may not be accurately located relative to the scale graduations in accordance with the previous calibration of the tube. More over such beak or teat is quite likely to be broken off and the anchorage of the tube relative to the scale lost.

The purpose of the present invention is to overcome such difficulties by providing anchorage for the tube upon the scale which may be accurately positioned and securely maintained.

The object of the invention is to improve the construction as well as the assembly of thermometer indicating tubes and their scales, whereby they may not only be economically manufactured, but will be more efficient and accurate in use, easily assembled permanently fixed in adjusted relation to the tube upon the scale, and unlikely to get out of order.

A further object of the invention is to provide an interlocking joint between the thermometer tube and its scale, which can be definitely and accurately located in accordance with the calibration of the tube, and which will resist considerable longitudinal thrust pressure and displacement to which the tube may be subjected.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

Referring to the drawings, wherein is shown the preferred but not necessarily the only form of embodiment of the invention:

Fig. 1 is a front view of a typical meat thermometer for determining cooking temperatures of various meats while cooking. The invention is not limited to such type of thermometer, which has been shown for illustrative purposes, because the present invention is peculiarily adapted thereto.

Fig. 2 is a side elevation thereof.

Fig. 3 is an enlarged sectional detail view.

Fig. 4 is a detail perspective view.

Like parts are indicated by similar characters of reference throughout the several views.

The present improvement may be embodied in ordinary room thermometers, with the same advantageous results as when applied to a meat cooking thermometer.

In the drawing, 1 indicates the thermometer tube and 2 identifies the graduated scale to which the tube is connected by clevises 3. It must be understood that thermometer tubes vary greatly in their capacities and the diameters of their bores, and must be carefully graded and selected for particular graduated scales having slight differences in the spacing of their graduations and vice versa.

In calibrating thermometers, a relative large number of previously filled and closed tubes are subjected to a predetermined known temperature. Because of varying capacities of the bores of the tubes the mercury or colored indicating fluid, as the case may be, will rise to different heights in different tubes, all however being indicative of the same degree of temperature. The height of columns of indicating fluid at the known temperature are marked on the several tubes. The distance from such mark to another assumed point, as the bulb end of the tube, is measured or gauged. Instead of measuring from the gauge mark to the bulb end of the tube another known temperature, as 32° F., the melting point of ice, may be taken as a second test point. Scales are then selected for each tube having exactly the same dimension between the scale graduations corresponding to the selected gauge points of the respective tubes. Ordinarily there are required a collection of graduated scales having the corresponding graduations spread over different distances which may be matched with indicating tubes having their predetermined gauge points, spaced apart like distances.

From this brief description it will be apparent that the tubes and graduated scales having been once matched, they must be fixedly anchored to each other so that they may not subsequently change their relation, and thus be caused to give false readings. A meat thermometer, which must resist thrust pressure into a piece of meat being cooked is especially susceptible to displacement of the tube and scale, which is one reason for selecting a meat thermometer for illustration of the instant invention.

In order to fixedly anchor the tube and graduated scale in their relative positions, the tube is provided with a transverse angular indentation or kerf 4 which is ground into the back of the tube in predetermined relation with a previously determined gauge. The scale 2 is formed with an integral projection or lug 5 comprising a bight of material, defined by relatively spaced incised lines. The ends of the bight are integral with the scale. Such integral bight 5 is offset out of the plane of the scale to form a projecting rib which is engageable within the angular indentation 4 of the tube. The indentation 4 affords a pair of relatively spaced shoulders which straddle the projection or bight 5 to maintain the relation of the tube with the selected matching graduated scale. Thus there is formed an interlocking joint which may be accurately positioned with certainty relative to the tube and graduated scale.

The tube is secured to the scale in any suitable manner as by bridging the tube with clevises 3 which are riveted to the scale plate 2, which is a conventional form of attachment.

The same structural features are applicable to thermometers for other purposes including room thermometers and other types wherein a tube containing indicating fluid is attached to a graduated scale in matching relation with the graduations thereof, and hence the invention is not limited to the specific embodiment shown.

From the above description it will be apparent that there is thus provided a device of the character described possessing the particular features of advantage before enumerated as desirable, but which obviously is susceptible of modification in its form proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A thermometer, wherein an indicator tube is attached to a graduated scale plate in predetermined relation therewith, a pair of relatively spaced shoulders on the side of the indicator tube contiguous to the scale plate and defined by a transverse cut in the tube below the general surface thereof and an integral tongue projected out of the plane of the scale plate into interlocking relation between the shoulders on the indicator tube.

2. A thermometer, wherein an indicator tube having calibration check points is attached to a graduated scale plate in predetermined relation therewith, said tube having an angular indentation below the general surface thereof extending transversely of the indicator tube in predetermined spaced relation with the calibration check points thereon, and a portion of the scale plate projecting from the face thereof into interengaging relation in the angular indentation of the tube to determine a prescribed relation of the tube and scale plate and prevent longitudinal displacement of the indicator tube relative to the scale plate.

3. A thermometer including a scale plate, a projection formed integrally therewith and projecting in offset relation with the face of the scale plate, a precalibrated indicating tube attached to the scale plate, the tube having in the general surface thereof contiguous to the scale plate a transverse notch in predetermined spaced relation with the calibration thereof within which notch said projection is engageable to interlock the tube to resist relative longitudinal displacement thereof.

4. A thermometer including a scale plate, a calibrated indicating tube attached thereto and having therein an indentation below the general surface of the tube in selected spaced relation with the end of the tube determined by the calibration thereof and a lug struck from the material of the scale plate and projecting in offset relation with the plane thereof, engageable in the indentation of the tube to predetermine the adjusted relation of the tube and scale plate.

5. The herein described method of mounting a thermometer tube in predetermined relation with a particular plate scale to be associated therewith, including subjecting the thermometer tube to known high and low temperatures to calibrate said tube and establish fixed reference points, matching the high and low reference points with a corresponding scale plate, and transversely incising the surface of the tube in predetermined spaced relation with the high reference point for interlocking engagement with a cooperating portion of the matching scale.

6. In a thermometer, a thermometer tube containing a thermosensitive liquid, said tube comprising a transparent stem and a bulb communicating therewith, a graduated scale plate, means securing said thermometer tube on said scale plate, said stem having a cut in its rear wall below the general surface of the tube, and a lug struck up from said scale plate and engaging said cut to prevent longitudinal shifting of the tube along the scale plate.

7. In a thermometer, a thermometer tube containing a thermosensitive liquid, said tube comprising a transparent stem and a bulb communicating therewith, a graduated scale plate on which said thermometer tube is mounted, said stem having a recess in its rear surface adjacent the scale plate and below the general surface of the tube, and means integrally joined with said scale plate engaging said recess to prevent longitudinal shifting of the tube along the plate.

8. In a thermometer, a thermometer tube, a graduated scale plate on which said tube is mounted, said tube having a transverse saw cut made in the general surface thereof adjacent said scale plate, and an integral portion of said scale plate projecting into and engageable within said saw cut to prevent longitudinal shifting of the tube along the scale plate.

9. In a thermometer, a thermometer tube containing a thermosensitive fluid, a graduated scale plate on which said tube is mounted, said tube having a rectilinear cut in the general surface thereof, and a lug provided with a non-circular edge struck up from said scale plate and engaging said cut to prevent longitudinal or rotary shifting of the tube relative to the scale plate.

10. A method of constructing a thermometer, including the steps of calibrating a thermometer tube to obtain predetermined high and low calibration points thereon, notching the rear surface of the tube a predetermined distance from one of said calibration points, forming in a scale plate a complementary formation spaced a like distance from the corresponding calibration point, and mounting the thermometer tube on the scale plate with said notch receiving said complementary formation.

11. A method of constructing thermometers, including the steps of imprinting scale plates with temperature indications, the scale plates being made in sets with the length of the graduated scale in each set varying with respect to the other sets to provide for matching with non-uniform thermometer tubes, deforming each scale plate at a point spaced a predetermined distance from a selected graduation on the scale, forming thermometer tubes, calibrating each tube to identify a calibration point corresponding to said selected graduation, forming each tube with a portion interengageable with the deformed point of said scale plates at a location spaced from said calibration point a distance equal to the spacing of said deformed point from said selected graduation, and installing tubes upon matching plates by interengaging the said portions on the tubes with the said deformed points on the scale plates.

12. In a method of assembling a fluid expansion thermometer tube and scale member having graduations for a range of temperatures, the steps of heating the thermometer tube to a known temperature, marking said thermometer tube opposite the top of the fluid therein and while subject to said known temperature, and providing a locating notch in said tube at a fixed distance from the marking and while the entire tube is below the annealing temperature of the glass thereof.

GEORGE DEAN HUNT.

References Cited in the file of this patent
UNITED STATES PATENTS

| Number | Name | Date |
|---|---|---|
| 33,935 | Finnell | Dec. 17, 1861 |
| 1,391,881 | Dreyfus | Sept. 27, 1921 |
| 1,827,778 | Bolton | Oct. 20, 1931 |
| 1,995,250 | Hiergesell | Mar. 19, 1935 |
| 2,119,344 | Nurnberg | May 31, 1938 |
| 2,551,706 | Roth et al. | May 8, 1951 |